(12) United States Patent
Noel, Sr.

(10) Patent No.: US 11,122,788 B2
(45) Date of Patent: Sep. 21, 2021

(54) FLY FISHING STORAGE ASSEMBLY

(71) Applicant: Timothy Noel, Sr., Wellsburg, WV (US)

(72) Inventor: Timothy Noel, Sr., Wellsburg, WV (US)

( * ) Notice: Subject to any disclaimer, the term of this patent is extended or adjusted under 35 U.S.C. 154(b) by 273 days.

(21) Appl. No.: 16/220,567

(22) Filed: Dec. 14, 2018

(65) Prior Publication Data

US 2020/0187476 A1 Jun. 18, 2020

(51) Int. Cl.
A01K 97/06 (2006.01)

(52) U.S. Cl.
CPC .................... A01K 97/06 (2013.01)

(58) Field of Classification Search
CPC ........ A01K 97/04; A01K 97/06; D05B 87/00; Y10S 206/818
USPC .................. 43/54.1, 57.1; 206/818
See application file for complete search history.

(56) References Cited

U.S. PATENT DOCUMENTS

| 2,783,571 | A | * | 3/1957 | Stilwell | A01K 91/04 289/17 |
| 3,197,915 | A | | 8/1965 | Staver | |
| 4,697,370 | A | * | 10/1987 | Vissing | A01K 91/04 289/17 |
| 5,228,232 | A | * | 7/1993 | Miles | A01K 97/06 43/54.1 |
| 5,410,836 | A | * | 5/1995 | Hardy | A01K 97/06 43/54.1 |
| 5,526,927 | A | * | 6/1996 | McLemore | A01K 97/06 206/315.11 |
| 5,555,671 | A | | 9/1996 | Voight | |
| 5,857,285 | A | * | 1/1999 | Little | A01K 97/06 206/315.11 |
| 6,516,555 | B2 | | 2/2003 | Buzzell | |
| 6,889,469 | B1 | * | 5/2005 | Chung | A01K 97/06 43/57.1 |
| 9,084,414 | B1 | * | 7/2015 | Fender | A01K 91/04 |
| 2006/0162234 | A1 | | 7/2006 | Gagnet | |
| 2011/0005121 | A1 | * | 1/2011 | Gelber | A01K 97/06 43/57.1 |
| 2016/0113262 | A1 | | 4/2016 | Scott | |
| 2017/0265448 | A1 | * | 9/2017 | Duffy | A01K 97/06 |

FOREIGN PATENT DOCUMENTS

WO    WO2016085303    6/2016

* cited by examiner

Primary Examiner — Brady W Frazier

(57) ABSTRACT

A fly fishing storage assembly includes a case. A first half of the case has a divot therein for receiving an eyelet of a fly fishing lure. A first magnet is coupled to a second half of the case for storing the fly fishing lures. A second magnet is coupled to the first half of the case and the second magnet is aligned with the divot. The second magnet magnetically engages the eyelet of the fly fishing lure to retain the fly fishing lure in the divot. A pair of guides is each aligned with the divot. Each of the guides is spaced apart from each other to define a fishing line space between the guides. The fishing line space guides a fishing line through the eyelet on the fly fishing lure to tie the fly fishing lure without the risk of dropping the fly fishing lure.

5 Claims, 4 Drawing Sheets

FLY FISHING STORAGE ASSEMBLY

(b) CROSS-REFERENCE TO RELATED APPLICATIONS

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

(2) Description of Related Art Including Information Disclosed Under 37 CFR 1.97 and 1.98

The disclosure and prior art relates to storage devices and more particularly pertains to a new storage device for PURPOSE.

(h) BRIEF SUMMARY OF THE INVENTION

An embodiment of the disclosure meets the needs presented above by generally comprising a case. A first half of the case has a divot therein for receiving an eyelet of a fly fishing lure. A first magnet is coupled to a second half of the case for storing the fly fishing lures. A second magnet is coupled to the first half of the case and the second magnet is aligned with the divot. The second magnet magnetically engages the eyelet of the fly fishing lure to retain the fly fishing lure in the divot. A pair of guides is each aligned with the divot. Each of the guides is spaced apart from each other to define a fishing line space between the guides. The fishing line space guides a fishing line through the eyelet on the fly fishing lure to tie the fly fishing lure without the risk of dropping the fly fishing lure.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
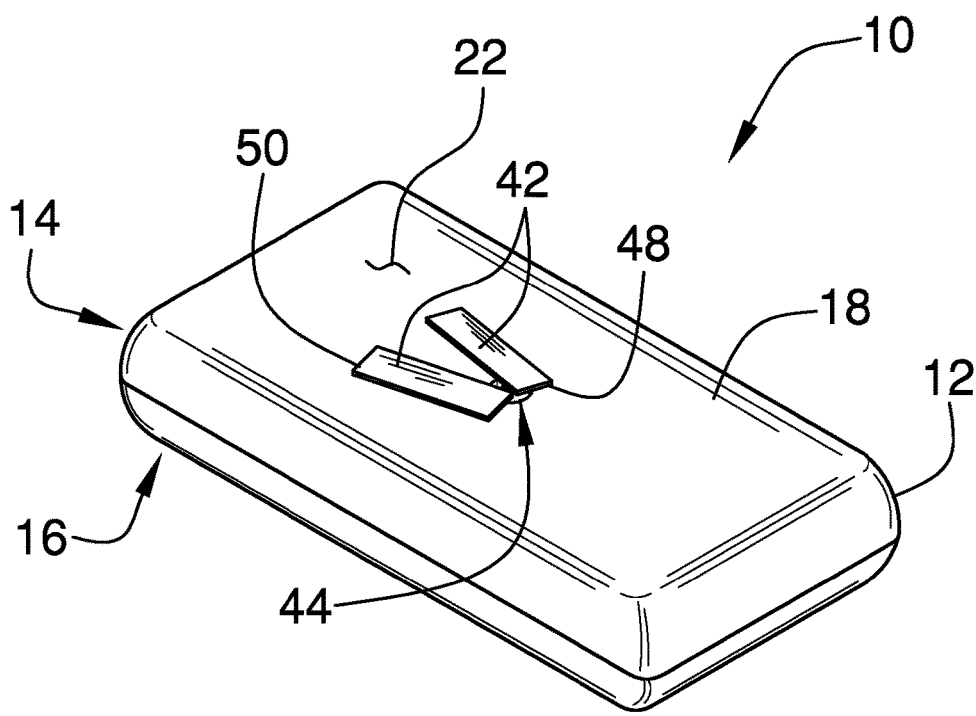
FIG. 1 is a top perspective view of a fly fishing storage assembly according to an embodiment of the disclosure showing a case being closed.
Figure 2:
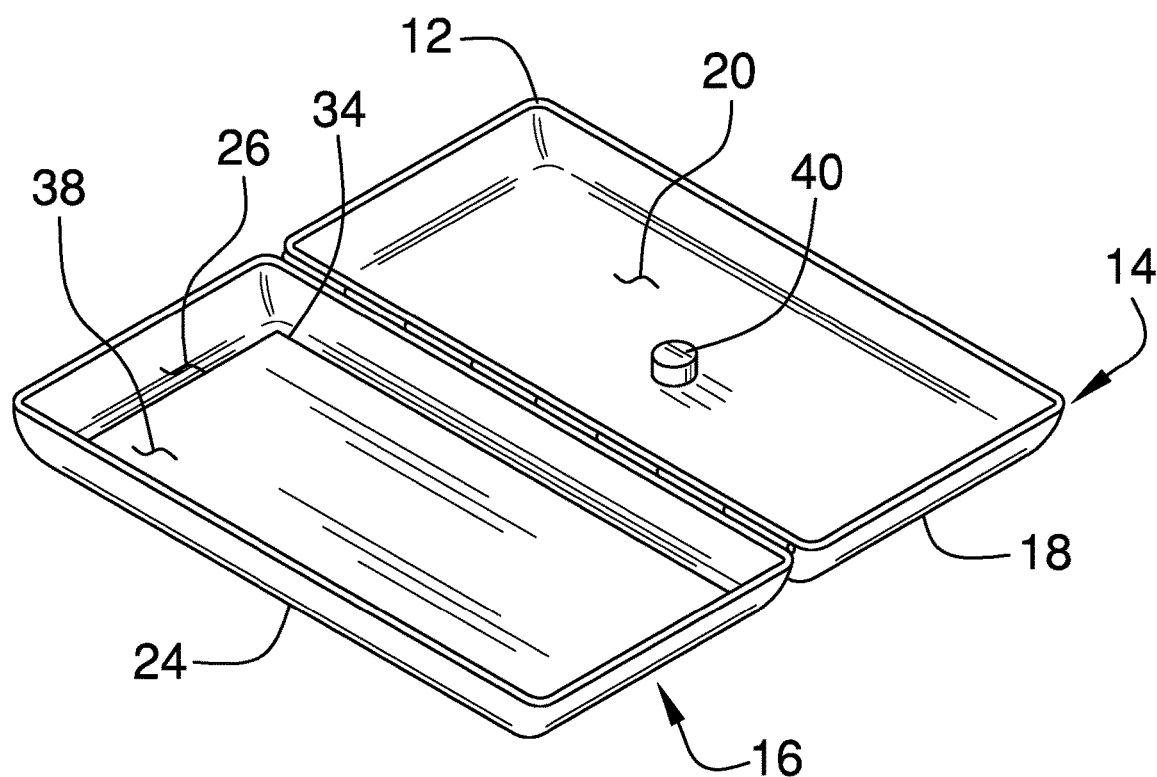
FIG. 2 is a perspective view of an embodiment of the disclosure showing a case being opened.
Figure 3:
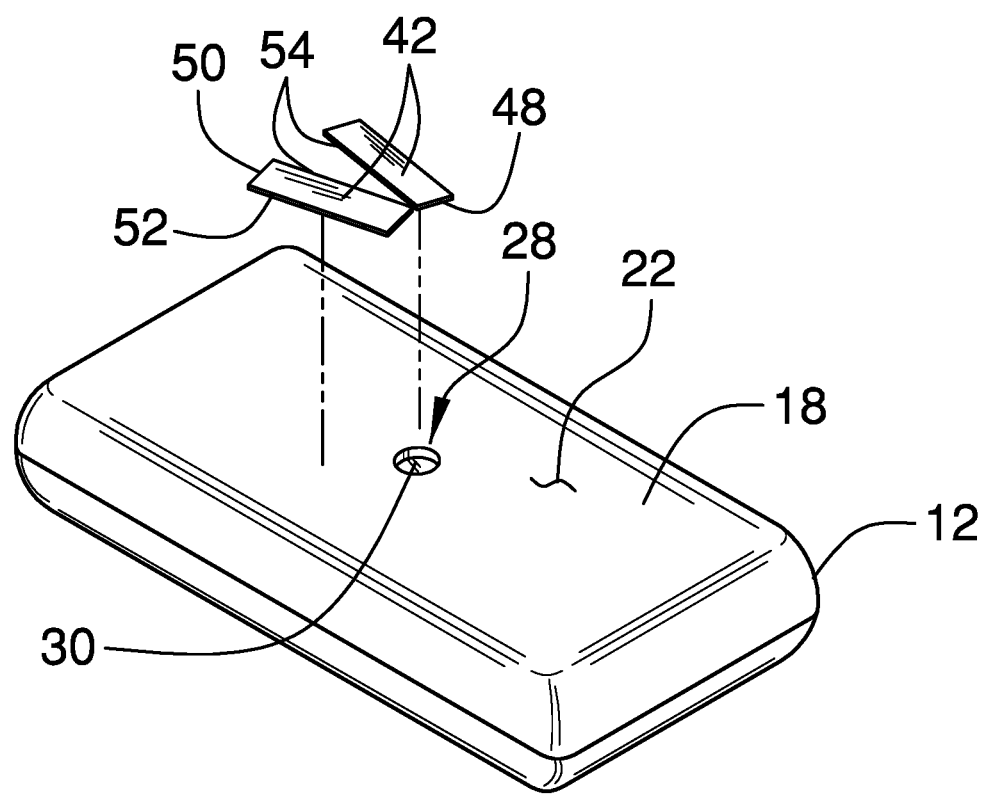
FIG. 3 is an exploded perspective view of an embodiment of the disclosure.
Figure 4:
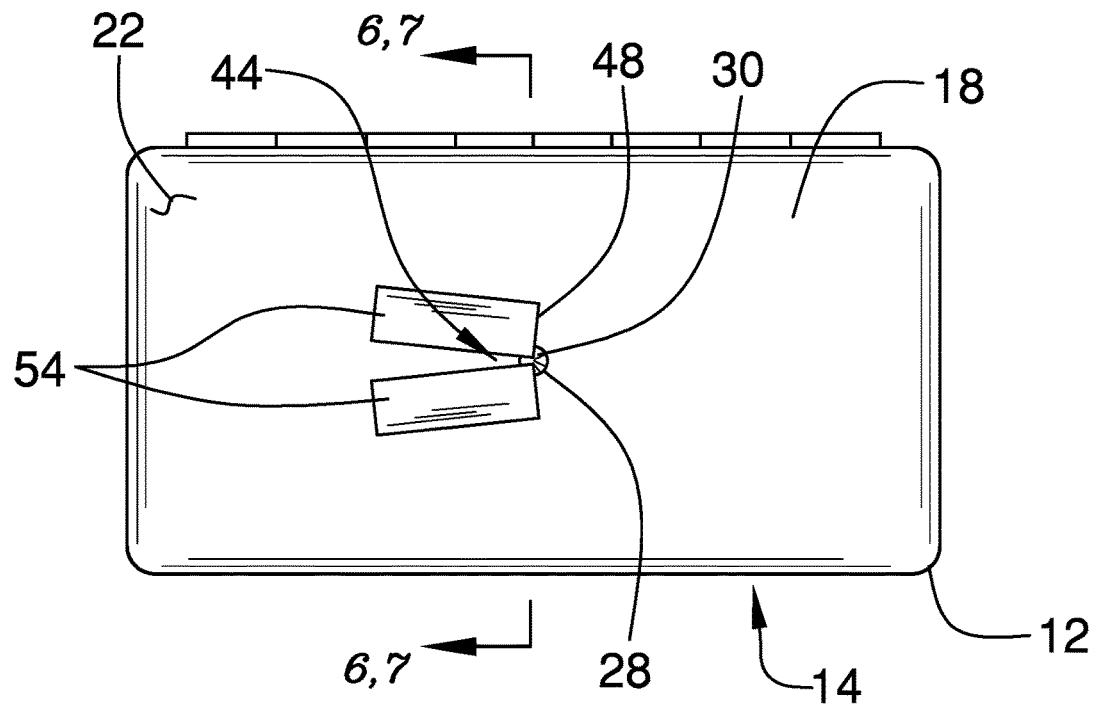
FIG. 4 is a top view of an embodiment of the disclosure.
Figure 5:
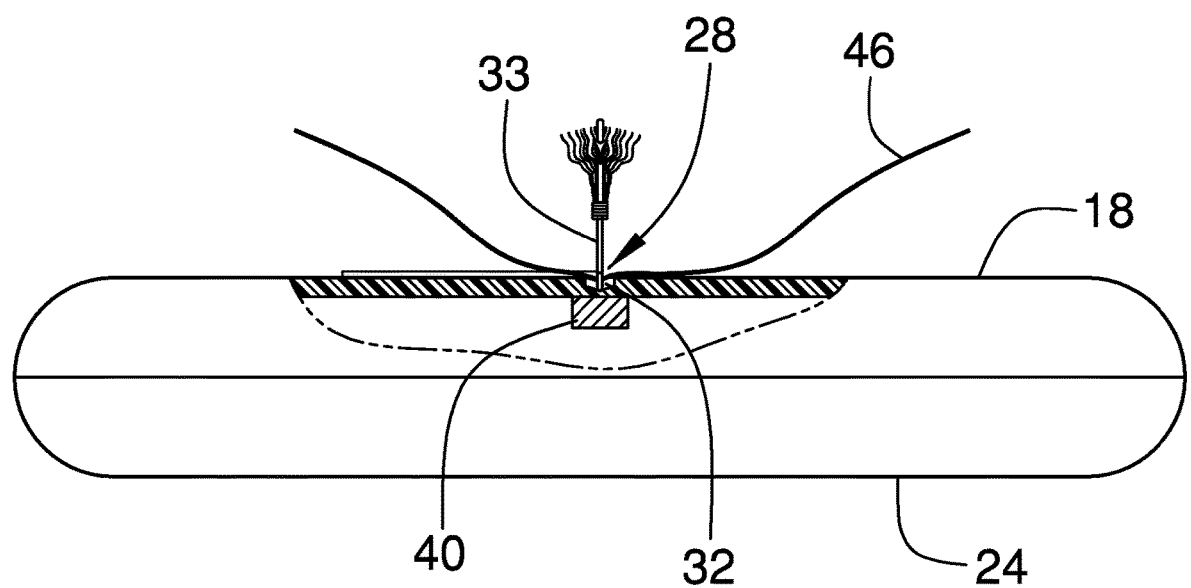
FIG. 5 is a front cutaway view an embodiment of the disclosure.
Figure 6:
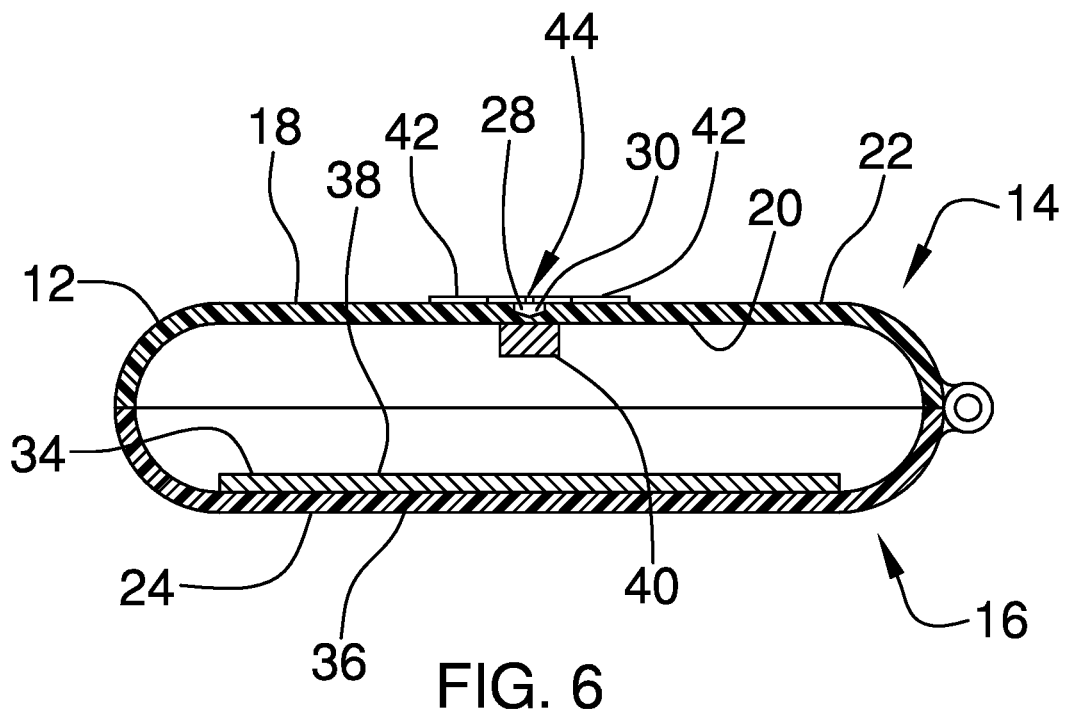
FIG. 6 is a cross sectional view taken along line 6-6 of FIG. 4 of an embodiment of the disclosure.
Figure 7:
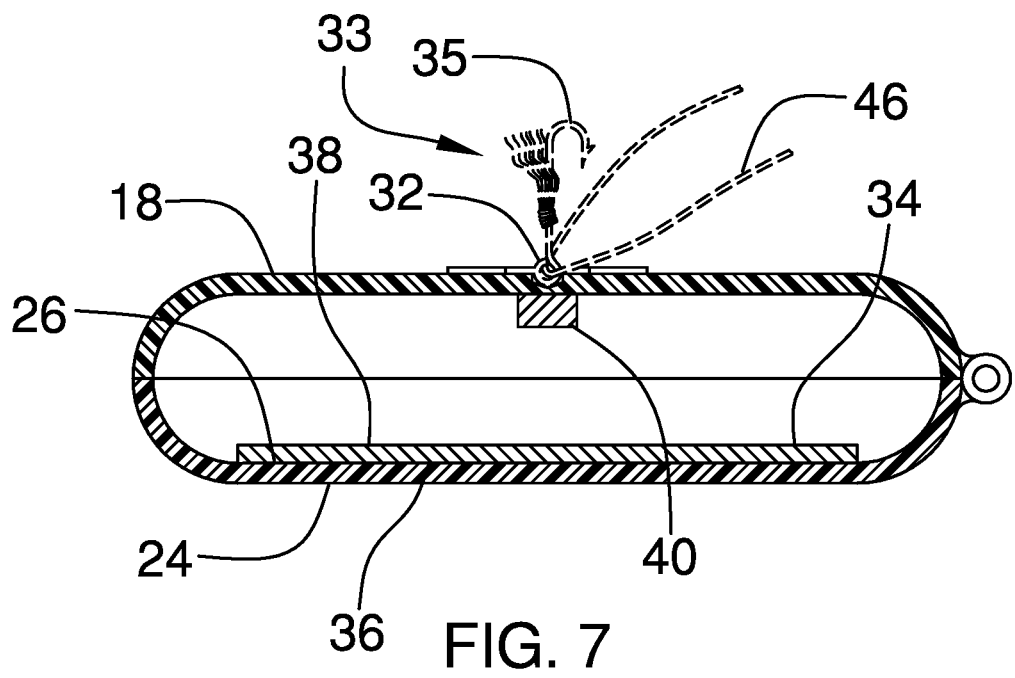
FIG. 7 is a cross sectional view taken along line 7-7 of FIG. 4 of an embodiment of the disclosure showing a fishing line being tied to a fly fishing lure.

With reference now to the drawings, and in particular to FIGS. 1 through 7 thereof, a new storage device embodying the principles and concepts of an embodiment of the disclosure and generally designated by the reference numeral 10 will be described.

As best illustrated in FIGS. 1 through 7, the fly fishing storage assembly 10 generally comprises a case 12 that is longitudinally divided to define a first half 14 of the case 12 being hingedly coupled to a second half 16 of the case 12. The first half 14 of the case 12 has an upper wall 18, and the upper wall 18 has a lower surface 20 and an upper surface 22. The second half 16 of the case 12 has a lower wall 24 and the lower wall 24 has a top surface 26. The upper surface 22 of the upper wall 18 has a divot 28 therein extending toward the lower surface 20 of the upper wall 18. The divot 28 has a bounding surface 30 and the bounding surface 30 is concavely arcuate with respect to the upper surface 22. Thus, the divot 28 can receive, and thusly conform to a curvature of, an eyelet 32 on a fly fishing lure 33.

A first magnet 34 is coupled to the second half 16 of the case 12. The first magnet 34 magnetically engages a hook 35 of fly fishing lures 33 for storing the fly fishing lures 33. The first magnet 34 has a first surface 36 and second surface 38, and the first surface 36 is bonded to the top surface 26 of the lower wall 24. Thus, the second surface 38 magnetically engages the hook 35 of the fly fishing lures 33 when the fly fishing lures 33 are positioned in the case 12. The first magnet 34 may cover an entirety of the top surface 26 of the lower wall 24.

A second magnet 40 is coupled to the first half 14 of the case 12 and the second magnet 40 is aligned with the divot 28. The second magnet 40 magnetically engages the eyelet 32 of the fly fishing lure 33 that has been positioned in the divot 28. In this way the fly fishing lure 33 is retained in the divot 28. Additionally, the fly fishing lure 33 is retained in a vertical orientation in the divot 28. The second magnet 40 is bonded to the lower surface 20 of the upper wall 18.

A pair of guides 42 is each coupled to the first half 14 of the case 12 and each of the guides 42 is aligned with the divot 28. Each of the guides 42 is spaced apart from each other to define a fishing line space 44 between the guides 42. A fishing line 46 can be extended through the fishing line space 44. Moreover, the fishing line space 44 is aligned with the divot 28 to guide the fishing line 46 through the eyelet 32 on the fly fishing lure 33 when the fly fishing lure 33 is positioned in the divot 28. In this way the guides 42 and the divot 28 facilitating the fishing line 46 to be tied to the fly fishing lure 33.

Each of the guides 42 has a first end 48, a second end 50 and a first surface 52 extending therebetween, and each of the guides 42 is elongated between the first 48 and second 50 ends. Additionally, each of the guides 42 has a first lateral edge 54 extending between the first 48 and second 50 ends. The first surface 52 of each of the guides 42 is bonded to the upper surface 22 of the upper wall 18 of the first half 14 of the case 12. The guides 42 are oriented has the first lateral edge 54 of the guides 42 facing each other. Additionally, each of the guides 42 is oriented having the first lateral edge 54 of each of the guides 42 angles away from each other such that the guides 42 form a V on the case 12. An intersection of the first lateral edge 54 and the first end 48 on each of the guides 42 is spaced apart from each other a predetermined distance to define the fishing line space 44. Moreover, the intersection between the first lateral edge 54 and the first end 48 of each of the guides 42 is positioned over the divot 28. The fishing line space 44 may have a width of approximately 0.3 mm thereby facilitating the fishing line space 44 to accommodate a maximum of 8.0 pound monofilament fishing line.

In use, selected fly fishing lures 33 are positioned in the case 12 prior to going on a fishing trip and the first magnet 34 inhibits the fly fishing lure 33s from falling out of the case 12. A selected one of the fly fishing lure 33s is removed from the case 12 and the eyelet 32 of the selected fishing lure 33 is positioned in the divot 28 having the selected fly fishing lure 33 extending upwardly from the divot 28. Additionally, the eyelet 32 of the selected fly fishing lure 33 is aligned with the fishing line space 44 when the selected fly fishing lure 33 is positioned in the divot 28. The fishing line 46 is slid through the fishing line space 44 thereby guiding the fishing line 46 through the eyelet 32 of the selected fly fishing lure 33. Thus, the selected fly fishing lure 33 can be tied onto the fishing line 46 without dropping the fly fishing lure 33. The selected fly fishing lure 33 is removed from the divot 28 once the fishing line 46 is tied onto the selected fly fishing lure 33.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fly fishing storage assembly being configured to magnetically retain fly fishing hooks in a preferred orientation for tying onto a fishing line, said assembly comprising:
   a case being longitudinally divided to define a first half of said case being hingedly coupled to a second half of said case, said first half of said case having a divot therein wherein said divot is configured to have an eyelet of a fly fishing lure being positioned therein;
   a first magnet being coupled to said second half of said case wherein said first magnet is configured to magnetically engage a hook of fly fishing lures for storing the fly fishing lures;
   a second magnet being coupled to said first half of said case, said second magnet being aligned with said divot, said second magnet magnetically engaging the eyelet of the fly fishing lure that has been positioned in said divot for retaining the fly fishing lure in said divot;
   a pair of guides, each of said guides being coupled to said first half of said case, each of said guides being aligned with said divot, each of said guides being spaced apart from each other to define a fishing line space between said guides wherein said fishing line space is configured to have a fishing line extended therethrough, said fishing line space being aligned with said divot wherein said fishing line space is configured to guide the fishing line through the eyelet on the fly fishing lure when the fly fishing lure is positioned in said divot thereby facilitating the fishing line to be tied to the fly fishing lure;
   wherein said first half of said case has an upper wall, said upper wall having a lower surface and an upper surface, said second half of said case having a lower wall, said lower wall having a top surface, said upper surface of said upper wall having said divot therein extending toward said lower surface of said upper wall, said divot having a bounding surface, said bounding surface being concavely arcuate with respect to said upper surface; and
   wherein each of said guides has a first end, a second end and a first surface extending therebetween, each of said guides being elongated between said first and second ends, each of said guides having a first lateral edge extending between said first and second ends, said first surface of each of said guides being bonded to said upper surface of said upper wall of said first half of said case.

2. The assembly according to claim 1, wherein:
   said first magnet has a first surface and second surface, said first surface being bonded to said top surface of said lower wall such that said second surface magnetically engages the hook of the fly fishing lures when the fly fishing lures are positioned in said case; and
   said second magnet is bonded to said lower surface of said upper wall.

3. The assembly according to claim 1, wherein said guides is oriented having said first lateral edge of said guides facing each other, each of said guides being oriented such said first lateral edge of each of said guides angles away from each other such that said guides form a V on said case.

4. The assembly according to claim 3, wherein an intersection of said first lateral edge and said first end on each of said guides is spaced apart from each other a predetermined distance to define said fishing line space, said intersection between said first lateral edge and said first end of each of said guides being positioned over said divot.

5. A fly fishing storage assembly being configured to magnetically retain fly fishing hooks in a preferred orientation for tying onto a fishing line, said assembly comprising:

a case being longitudinally divided to define a first half of said case being hingedly coupled to a second half of said case, said first half of said case having an upper wall, upper wall having a lower surface and an upper surface, said second half of said case having a lower wall, said lower wall having a top surface, said upper surface of said upper wall having a divot therein extending toward said lower surface of said upper wall, said divot having a bounding surface, said bounding surface being concavely arcuate with respect to said upper surface wherein said divot is configured to receive an eyelet on a fly fishing lure;

a first magnet being coupled to said second half of said case wherein said first magnet is configured to magnetically engage a hook of fly fishing lures for storing the fly fishing lures, said first magnet having a first surface and second surface, said first surface being bonded to said top surface of said lower wall such that said second surface magnetically engages the hook of the fly fishing lures when the fly fishing lures are positioned in said case;

a second magnet being coupled to said first half of said case, said second magnet being aligned with said divot, said second magnet magnetically engaging the eyelet of the fly fishing lure that has been positioned in said divot for retaining the fly fishing lure in said divot, said second magnet being bonded to said lower surface of said upper wall; and a pair of guides, each of said guides being coupled to said first half of said case, each of said guides being aligned with said divot, each of said guides being spaced apart from each other to define a fishing line space between said guides wherein said fishing line space is configured to have a fishing line extended therethrough, said fishing line space being aligned with said divot wherein said fishing line space is configured to guide the fishing line through the eyelet on the fly fishing lure when the fly fishing lure is positioned in said divot thereby facilitating the fishing line to be tied to the fly fishing lure, each of said guides having a first end, a second end and a first surface extending therebetween, each of said guides being elongated between said first and second ends, each of said guides having a first lateral edge extending between said first and second ends, said first surface of each of said guides being bonded to said upper surface of said upper wall of said first half of said case, said guides being oriented having said first lateral edge of said guides facing each other, each of said guides being oriented such said first lateral edge of each of said guides angles away from each other such that said guides form a V on said case, an intersection of said first lateral edge and said first end on each of said guides being spaced apart from each other a predetermined distance to define said fishing line space, said intersection between said first lateral edge and said first end of each of said guides being positioned over said divot.

* * * * *